June 15, 1954  G. A. CLARK  2,681,038

BIRDHOUSE

Filed Oct. 15, 1951

George A. Clark
INVENTOR.

Patented June 15, 1954

2,681,038

UNITED STATES PATENT OFFICE 2,681,038

BIRDHOUSE

George A. Clark, Ames, Iowa

Application October 15, 1951, Serial No. 251,327

1 Claim. (Cl. 119—23)

This invention relates to new and useful improvements and structural refinements in bird houses, and the principal object of the invention is to provide a bird house of the character herein described, which may be very simply, easily and conveniently erected.

Particularly, the invention contemplates the provision of a simple plate having appropriate slits preformed therein to define bendable elements, the arrangement being such that the plate may be purchased and the bendable elements thereon angulated by the purchaser for subsequent application to a simple can, resulting in the formation of a simple bird house. The can may or may not be supplied to the purchaser with the preformed plate.

Some of the advantages of the invention lie in its extreme simplicity of construction, in its adaptability to expeditious erection as aforesaid, and in its adaptability to economical manufacture.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
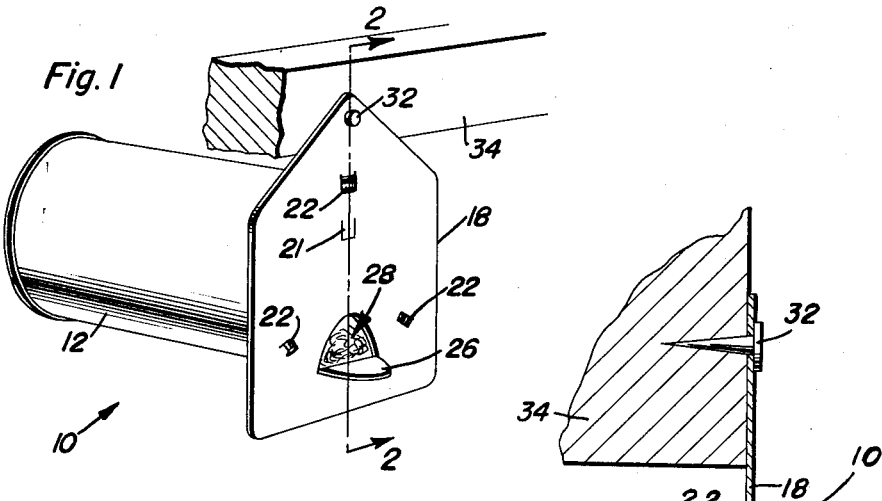
Figure 1 is a perspective view of the invention installed on a support.

Referring now to the accompanying drawings in detail, the invention consists of a bird house which is designated generally by the reference character 10 and embodies in its construction a suitable cylindrical housing such as a can 12, which is disposed horizontally and has a closed end wall 14 and an open end 15 provided with an outwardly projecting, marginal bead 16.

Figure 2:
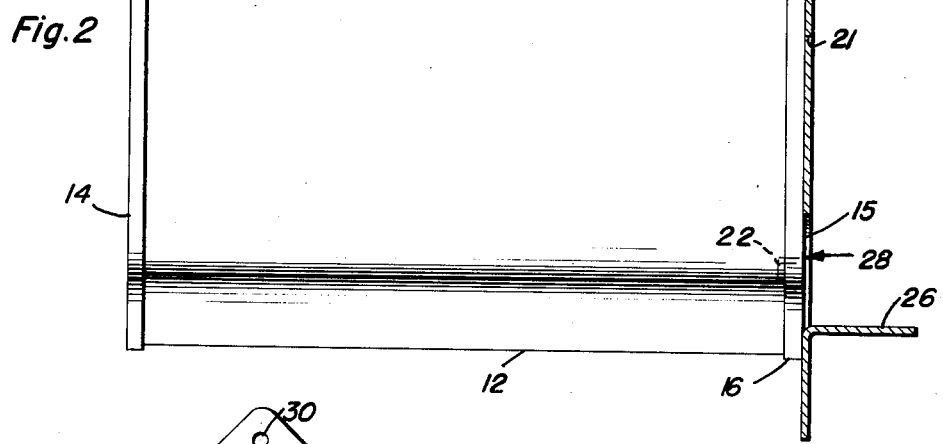
Figure 2 is an enlarged vertical sectional view, taken substantially in the plane of the line 2—2 in Figure 1, but illustrating the can-like housing in elevation.
Figure 3:
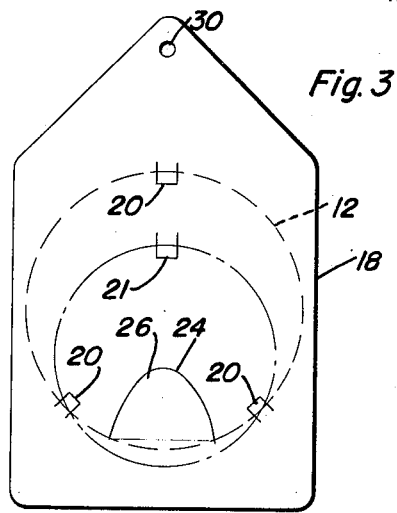
Figure 3 is a plan view of the preformed plate, such as may be supplied to the purchaser.

The essence of novelty in the invention resides in the provision of a substantially flat front plate or panel 18 which is provided with a plurality of substantially U-shaped slits 20 (see Figure 3), defining bendable tongues or detents 22 which are angulated rearwardly and inwardly as shown in Figure 2 so as to engage the bead 16 and thereby sustain the can or housing 12 in abutment with the rear surface of the plate 18, as will be clearly apparent. If desired, additional slits 21 may be formed in the plate 18 to provide detents for the accommodation of cans of different sizes.

The plate 18 is also formed with an inverted, substantially U-shaped slit 24 affording a portion 26 which may be bent forwardly to provide a landing platform, while at the same time furnishing an entrance opening 28 for the housing 12, as will be clearly apparent.

The upper end portion of the plate 18 is formed with an aperture 30 to accommodate a fastening element 32 whereby the entire bird house may be secured to a suitable support 34.

It is believed that the advantages and use of the invention will be readily understood from the foregoing disclosure and accordingly, further description thereof at this time is deemed unnecessary While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In combination, a bird house comprising a vertically elongated metallic plate including means on its upper end portion for suspending said plate from an elevated support, a perch projecting forwardly from the lower portion of the plate, a cylindrical can including a beaded open end abutting the rear face of the plate and extending rearwardly therefrom beneath the support, and bendable, rearwardly directed tongues integral with the plate and engaged at circumferentially spaced points with the beaded end portion of the can for securing said can on the plate, said plate having an opening in its lower portion immediately above the perch communicating with the can, the marginal portions of said plate extending a substantial distance beyond the periphery of the can for substantially concealing said can when the bird house is viewed from the front.

References Cited in the file of this patent

UNITED STATES PATENTS

| Number | Name | Date |
|---|---|---|
| 175,606 | Hillman | Apr. 4, 1876 |
| 182,842 | Miller | Oct. 3, 1876 |
| 656,965 | Green | Aug. 28, 1900 |
| 786,768 | Keller | Apr. 4, 1905 |
| 1,477,861 | Allen | Dec. 18, 1923 |
| 1,987,347 | Moore | Jan. 8, 1935 |
| 2,494,709 | Keagle | Jan. 17, 1950 |